United States Patent
Gelernt et al.

(10) Patent No.: US 8,472,111 B2
(45) Date of Patent: *Jun. 25, 2013

(54) APPARATUS AND METHOD FOR DEEP ULTRAVIOLET OPTICAL MICROSCOPY

(75) Inventors: Barry Gelernt, Oceanside, CA (US); Thomas D. Milster, Tucson, AZ (US)

(73) Assignees: The Arizona Board of Regents on behalf of the University of Arizona, Tucson, AZ (US); Invent Technologies LLC, Oceanside, CA (US)

( * ) Notice: Subject to any disclaimer, the term of this patent is extended or adjusted under 35 U.S.C. 154(b) by 567 days.

This patent is subject to a terminal disclaimer.

(21) Appl. No.: 12/304,494

(22) PCT Filed: Jun. 12, 2007

(86) PCT No.: PCT/US2007/071003
§ 371 (c)(1),
(2), (4) Date: Dec. 12, 2008

(87) PCT Pub. No.: WO2007/146938
PCT Pub. Date: Dec. 21, 2007

(65) Prior Publication Data
US 2009/0168152 A1 Jul. 2, 2009

Related U.S. Application Data

(60) Provisional application No. 60/812,912, filed on Jun. 13, 2006.

(51) Int. Cl.
*G06K 7/10* (2006.01)
*G02B 21/00* (2006.01)
*G01J 3/00* (2006.01)

(52) U.S. Cl.
USPC .............................. 359/350; 359/368; 356/51

(58) Field of Classification Search
USPC ...................... 359/350, 368; 356/51
See application file for complete search history.

(56) References Cited

U.S. PATENT DOCUMENTS

| | | | |
|---|---|---|---|
| 3,507,987 A | 4/1970 | Bosch | |
| 4,617,531 A | 10/1986 | Bowlds et al. | |

(Continued)

FOREIGN PATENT DOCUMENTS

| | | |
|---|---|---|
| GB | 1495104 | 12/1977 |
| WO | 2007/146938 A2 | 12/2007 |

OTHER PUBLICATIONS

PCT Notification of Transmittal of the International Search Report and the Written Opinion of the International Searching Authority, or the Declaration, relating to International Application No. PCT/US07/71003, date of mailing, Feb. 20, 2008 (8 pgs.).

(Continued)

*Primary Examiner* — Thomas K Pham
*Assistant Examiner* — William M Johnson
(74) *Attorney, Agent, or Firm* — Whyte Hirschboeck Dudek S.C.

(57) ABSTRACT

An apparatus and method for performing optical microscopy are disclosed. In at least one embodiment, the apparatus includes a deep ultraviolet light source configured to generate light having a wavelength within a window in the deep ultraviolet region of the electromagnetic spectrum within which a local minimum in the absorption coefficient of Oxygen occurs. Further, the apparatus includes a lens device that receives at least a first portion of the generated light, directs at least some of the first portion of the generated light toward a location, receives reflected light from the location, and directs at least some of the reflected light toward a further location. Additionally, the apparatus includes a camera device that is positioned at one of the further location and an additional location, where the camera device receives at least a second portion of the reflected light, whereby an image is generated by the camera device.

38 Claims, 9 Drawing Sheets

U.S. PATENT DOCUMENTS

| | | | |
|---|---|---|---|
| 4,863,253 | A | 9/1989 | Shafer et al. |
| 5,331,456 | A | 7/1994 | Horikawa |
| 5,499,282 | A | 3/1996 | Silfvast |
| 6,324,150 | B1 | 11/2001 | Ju |
| 6,343,089 | B1 | 1/2002 | Manos et al. |
| 6,343,227 | B1 * | 1/2002 | Crowley ............... 600/407 |
| 6,369,398 | B1 | 4/2002 | Gelernt |
| 6,605,815 | B2 | 8/2003 | Gelernt |
| 6,650,357 | B1 * | 11/2003 | Richardson ............ 348/80 |
| 6,751,516 | B1 * | 6/2004 | Richardson ........... 700/119 |
| 6,801,358 | B2 * | 10/2004 | Shafer et al. ......... 359/355 |
| 7,126,131 | B2 * | 10/2006 | Harrison ............... 250/372 |
| 7,218,592 | B2 | 5/2007 | Park et al. |
| 7,218,596 | B2 | 5/2007 | Gelernt |
| 7,327,444 | B2 | 2/2008 | Naka et al. |
| 7,359,044 | B2 | 4/2008 | Nishiyama et al. |
| 7,916,291 | B2 * | 3/2011 | Milster et al. ......... 356/301 |
| 8,198,582 | B2 | 6/2012 | Raptakis et al. |
| 2002/0136144 | A1 | 9/2002 | Hatano |
| 2003/0043472 | A1 * | 3/2003 | Mandella ............... 359/641 |
| 2005/0111081 | A1 | 5/2005 | Shafer et al. |
| 2005/0254049 | A1 * | 11/2005 | Zhao et al. ............. 356/369 |
| 2006/0012780 | A1 | 1/2006 | Nishiyama et al. |
| 2006/0050146 | A1 | 3/2006 | Richardson |
| 2006/0072419 | A1 | 4/2006 | Tukker |
| 2008/0304522 | A1 * | 12/2008 | Mills ..................... 372/5 |
| 2009/0236543 | A1 | 9/2009 | Ooki et al. |
| 2010/0053599 | A1 | 3/2010 | Milster |

OTHER PUBLICATIONS

Liberman et al., "Prospects for photolithography at 121 nm," J. Vac. Sci. Technol. B, vol. 20, No. 6, Nov./Dec. 2002 (pp. 2567-2573).
Joshi, "Generation of Radiation by Intense Plasma and Electromagnetic Undulators," Final Technical Report, Submitted by: The Regents of the University of California University of California, Los Angeles School of Engineering and Applied Science Los Angeles, Oct. 1991 (80 pgs.).
David et al., "Ultraviolet reflectance of AlN, diamond-like carbon, and SiC thin films," Appl. Phys. Lett., 57 (11), 1990 (pp. 1093-1095).
Norris et al., "Reflecting microscopes with spherical mirrors," J. Opt. Soc. Am., 41, 111 (1951).
Miyata, "Reflecting microscope objectives with nonspherical mirrors," J. Opt. Soc. Am., 42, 431 (1952).
Grey, "A new series of microscope objectives: I. Catadioptric Newtonian Systems," J. Opt. Soc. Am., 39, 719 (1949).
Arioukov et al., "Schwartzschild Objective for Soft X-rays," (Opt. Eng. 39 (8), 2000 (pp. 2163-2170).
Grey, "A new series of microscope objectives: II. Preliminary investigation of catadioptric Schwarzschwarzschild systems," 39, 723 (1949).
Grey, "New series of microscope objectives: III. Ultraviolet objectives of intermediate numerical aperture," 40, 283 (1950).
Korsch, "Reflective Optics," Aademic Press, San Diego, (1991); 4 pages.
MacDonald, "Microwave Breakdown in Gases," John Wiley, New York, (1966).
Gelernt et al., "Quenching and Radiative Lifetimes for NH (b1ε+, v1=0)," Chem. Phys. Lett. 36, 238 (1975).
Zaidel & Schreider, "Vacuum Ultraviolet Spectroscopy," Ann Arbor-Humphrey Science Publishers 1970 (pp. 2-20, 47-53 and 280-281.
Hamamatsu Data Sheet for BT(Back-thinned)-CCD Digital Camera C8000-10, Hamamatsu Photonics, K.K. of Hamamatsu City, Japan, Jul. 2001 (2 pgs.).
Supplementary European Search Report, relating to Application No. EP 07 79 8444, date of completion of search, Jun. 16, 2009 (9 pgs.).
Atwood et al., "X-ray microimaging for the life sciences," EDB 90:159921, NDN-108-0533-3189-9, Conference date: May 24 to May 26, 1989; 9 pages.
Watanabe, "Ultraviolet Absorption Processes in Upper Atmosphere," Advan. Geophys. 5, 153, 1958 (2 pgs.).
Yoshikawa et al., "Development of an extreme ultraviolet imaging spectrometer for the BepiColombo mission," Advances in Space Research, 33, (2004) (pp. 2195-2199).
UV Solutions, "High Brightness VUV Lamp" Spec. Sheet, © 2009 UV Solutions, Inc. (1 pg.).
De Wolf, "Raman Spectroscopy: About Chips and Stress," Spectroscopy Europe, 15/2, (2003) (pp. 6-13).
Jobin-Yvon Raman Applications, No. 01, available at http://www.jobinyvon.com/Raman/Semiconductor_Applications.
Chen et al., "Near-Field Solid Immersion Lens (SIL) Microscope with Advanced Compact Mechanical Design," Proc. SPIE, vol. 5380, Sep. 2004 (pp. 634-664).
Milster et al., "Maskless Lithography with Solid Immersion Lens Nano Probes," Proc. SPIE, vol. 5567, Dec. 2004 (pp. 545-556).
Chen et al., "Experimental investigation of solid immersion lens lithography," Proc. SPIE, vol. 5754, May 2005 (pp. 254-261).
Khulbe, et al., "Raman scattering from oval defects in GaAs epilayers," Applied Physics Letters, vol. 63, Issue 4, Jul. 1993 (pp. 488-490).
Novotny, et al.; "Principals of Nano-optics"; Nanoscale optical microscopy, 14 pages, 2006.
Response to Office Communication; European Patent Application No. 07798444.1; Apr. 14, 2010; 19 pages.
Office Communication; European Patent Application No. 07798444.1; Oct. 6, 2011; 9 pages.
U.S. Appl. No. 12/614,281; United States Patent & Trademark Office; Non-Final Rejection; Mar. 16, 2010; 11 pages.
U.S. Appl. No. 12/614,281; United States Patent & Trademark Office; Response to Non-Final Rejection; Jul. 16, 2010; 15 pages.
U.S. Appl. No. 12/614,281; United States Patent & Trademark Office; Notice of Allowance; Aug. 23, 2010; 18 pages.
U.S. Appl. No. 12/614,281; United States Patent & Trademark Office; Notice of Allowance; Nov. 15, 2010; 23 pages.

* cited by examiner

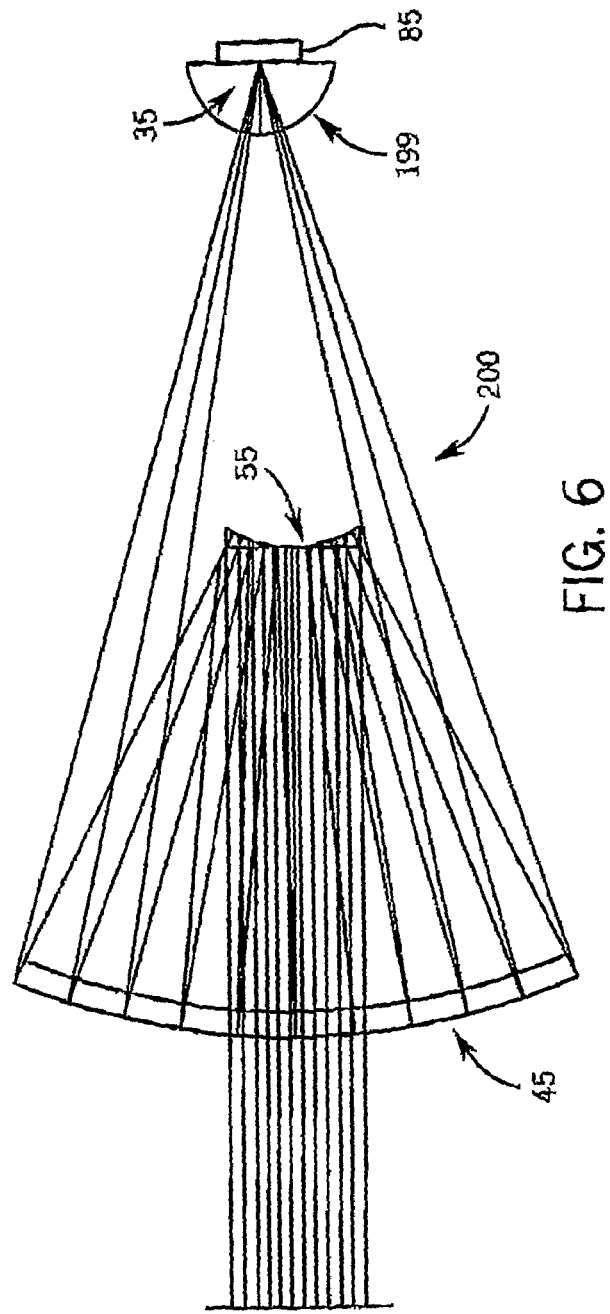

APPARATUS AND METHOD FOR DEEP ULTRAVIOLET OPTICAL MICROSCOPY

CROSS-REFERENCE TO RELATED APPLICATIONS

This application claims the benefit of U.S. provisional patent application No. 60/812,912 entitled "Method and Apparatus for Deep Ultraviolet Microscopy" filed on Jun. 13, 2006, which is hereby incorporated by reference herein.

STATEMENT REGARDING FEDERALLY SPONSORED RESEARCH OR DEVELOPMENT

FIELD OF THE INVENTION

The present invention relates to optical microscopy and, more particularly, to methods and apparatuses for optical microscopy that employ light at wavelengths outside of the visible light spectrum.

BACKGROUND OF THE INVENTION

Optical microscopes have numerous applications in both the physical sciences as well as in the life sciences. In semiconductor manufacturing for example, visible light microscopes are used for inspecting semiconductor wafers following many of the several hundred process steps employed to fabricate semiconductor devices. This optical wafer inspection technique has advantages over the use of electron microscopy. In particular, optical microscopy is a non-destructive technique in that it does not involve breaking valuable wafers. Also, optical microscopy does not involve evaporating coating onto the samples, or evacuating the sample chamber, both of which can be time consuming. Further, optical microscopes typically do not cost as much as electron microscopes, and the technical skill level required to operate optical microscopes to obtain high quality micrographs typically need not be as high as that required to operate electron microscopes.

Notwithstanding the advantages of optical microscopes relative to electron microscopes such as those described above, in recent years there has been a significant decline in the sale of optical microscopes. This is partially due to a decline in their utility for semiconductor research and manufacturing, where the minimum feature size for present day devices has decreased to less than 0.5 microns, and in some advanced chip designs to less than 0.1 microns. In particular, because the ability of visible light optical microscopes to discern useful information concerning features of 0.5 microns or less is marginal, electron microscopes have increasingly become the tool of choice in observing such features.

In view of these considerations, and since the resolution of an optical imaging system scales linearly with wavelength, it is desirable to design an optical microscope that utilizes light at shorter wavelengths than light within the visible spectrum. A number of techniques involving shorter-wavelength light have been considered, yet these techniques suffer from various disadvantages. For example, while an optical microscope employing light within the near ultraviolet range (approximately 200 nm<$\lambda$<400 nm) may provide some wavelength advantage over a visible light optical microscope, the difficulties of image display and aberrations in optical components may not justify that advantage.

Also for example, a number of ultraviolet microscopes have been designed for the "soft X-ray" region, particularly at a wavelength of 2.48 nm. This wavelength is useful because of reduced water absorption by biological specimens in the range 2.4-4.4 nm. The radiation source is the six-fold ionized Nitrogen atom, N VII. However, it is difficult energetically to dissociate Nitrogen and then form the $N^{+6}$ ion in an electronically excited state. Indeed, to perform such a process and thereby generate light at the desired wavelength, complicated methods and equipment such as pinched plasma sources and high-powered pulsed lasers are necessary. Further, because the atmosphere substantially absorbs light at the above-mentioned wavelengths, optical microscopes utilizing light at such wavelengths typically must be designed so that the transmission of light occurs within a high vacuum. Implementation of a microscope in a manner such that light is transmitted within a high vacuum, however, can be challenging and costly.

For at least these reasons, it would be advantageous if a new optical microscope and/or imaging system, and/or a related method of performing optical microscopy could be developed. In at least some embodiments, it would be particularly advantageous if such an improved microscope, imaging system and/or method utilized light at one or more wavelengths that were shorter than those of the visible light spectrum, so as to allow for enhanced viewing of small features. Further, in at least some embodiments, it would be particularly advantageous if such an improved microscope, imaging system and/or method could be implemented without the need for extremely complicated or costly light sources, and/or could achieve successful operation even without the use of a high vacuum to facilitate the efficient transmission of light.

SUMMARY OF THE INVENTION

The present inventors have recognized that an improved optical microscope (and/or related imaging system and/or method of performing optical microscopy) suitable for viewing many small features can be achieved in at least some embodiments by utilizing the intense, substantially monochromatic and isolated radiation of the atomic Hydrogen resonance line at 121.6 nm (the Hydrogen Lyman-$\alpha$ line) in the deep or vacuum ultraviolet region of the electromagnetic spectrum (e.g., $\lambda$<190 nm).

The present inventors have further recognized that the use of light at this wavelength is advantageous in several regards. More particularly, the present inventors have recognized that there is a narrow, highly transparent "window" in the air absorption spectrum, also precisely at 121.6 nm, such that light emitted at the Hydrogen Lyman-$\alpha$ line from a light source can be effectively transmitted within the optical microscope without the need to work in high vacuum. Additionally, the present inventors have recognized that effective light sources and optical components can be developed for giving off and transmitting strong, relatively-monochromatic light at the Hydrogen Lyman-$\alpha$ line.

More particularly, in at least some embodiments the present invention relates to an apparatus for performing optical microscopy. The apparatus includes a deep ultraviolet light source configured to generate light having a wavelength within a window in the deep ultraviolet region of the electromagnetic spectrum within which a local minimum in the absorption coefficient of Oxygen occurs. Further, the apparatus includes a lens device that receives at least a first portion of the generated light, directs at least some of the first portion of the generated light toward a target location, receives reflected light from the target location, and directs at least some of the reflected light toward a further location. Additionally, the apparatus includes a camera device that is positioned at one of the further location and an additional location, where the camera device receives at least a second portion of the reflected light, whereby an image is generated by the camera device based upon the second portion of the reflected light.

Additionally, in at least some embodiments the present invention relates to a method of performing optical microscopy. The method includes generating light at a light source, wherein a wavelength of the generated light is within a window in the deep ultraviolet region of the electromagnetic spectrum within which a local minimum in the absorption coefficient of Oxygen occurs, the window being at least one of about 1.0 nm and about 2.0 nm in width. The method further includes transmitting the generated light to a target location by way of at least one lens device, and communicating reflected light received from the target location to a further location, where at least a portion of the reflected light is at the wavelength and occurs in response to the transmitting of the generated light to the target location. The method additionally includes producing an image based upon the reflected light.

Further, in at least some embodiments the present invention relates to an apparatus for performing optical microscopy. The apparatus includes means for generating light having a wavelength within a window in the deep ultraviolet region of the electromagnetic spectrum, where an absorption coefficient of Oxygen at standard temperature and pressure that corresponds to the first wavelength is less than 25 atm$^{-1}$ cm$^{-1}$. The apparatus additionally includes means for directing at least a first portion of the generated light toward a target region and for directing reflected light received from the target region toward a further location in a substantially collimated manner. The apparatus also includes means for producing an image based upon at least a portion of the reflected light, the image being representative of a feature of a target item positioned at the target region.

BRIEF DESCRIPTION OF THE DRAWINGS

FIG. 6 shows a further exemplary lens arrangement including a solid immersion lens, which can be employed in the optical microscope of FIG. 1;

DETAILED DESCRIPTION OF THE PREFERRED EMBODIMENT

Figure 1:
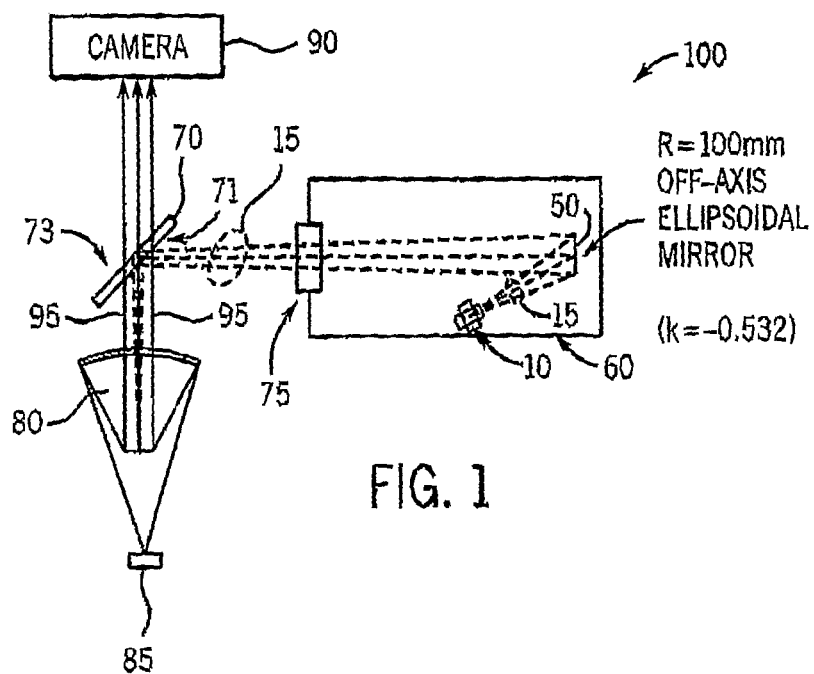
FIG. 1 shows, in simplified schematic form, exemplary components of an optical microscope that utilizes light at the Hydrogen Lyman-α line, in accordance with one embodiment of the present invention.

FIG. 1 illustrates, in simplified schematic form, exemplary components of an optical microscope 100, in accordance with at least one embodiment of the present invention. As will be described in further detail below, the optical microscope 100 operates through the use of light at the Hydrogen Lyman-α line, that is, light at (or approximately at) a wavelength of 121.6 nm. This wavelength is in the "vacuum ultraviolet" and "deep ultraviolet" regions of the electromagnetic spectrum, which generally overlap one another, albeit the vacuum ultraviolet region is generally understood to extend from the region of strong absorption by molecular Oxygen near about 190 nm to the "Soft" X-ray region near 20 nm while the deep ultraviolet region is generally understood to extend to wavelengths somewhat higher than 190 nm (e.g., up to nearly 200 (e.g., 193) or 250 (e.g., 248) nm. Further as will be described below, utilization of light at the Hydrogen Lyman-α line should provide about a five-fold increase in the resolution achievable by the optical microscope 100 relative to conventional optical microscopes, and thereby extend the usefulness of optical microscopy to a variety of applications.

As shown in FIG. 1, the optical microscope 100 in the present embodiment includes a source module 60, a beam splitter 70, an objective lens 80, and a camera module 90. Within the source module 60, light at the Hydrogen Lyman-α line is generated by way of a microwave-driven gas-discharge light source 10, which is described in further detail with respect to FIG. 7. Further as shown, light 15 emanating from the light source 10 is reimaged by an ellipsoidal mirror 50, which also is positioned within the source module 60. The ellipsoidal mirror 50 in turn reflects the light 15 out of the source module 60 and toward the beam splitter 70. In some embodiments including the present embodiment, to pass out of the source module 60 the light 15 passes through an optical window 75. By employing such a window, the interior of the source module 60 can be substantially sealed off from the outside atmosphere.

Upon the light 15 reaching the beam splitter 70, the beam splitter reflects a fraction of the incoming light 15 to the objective lens 80. Although the beam splitter 70 can take various forms, in the present embodiment it is a MgF$_2$ beam splitter that includes a first substantially planar surface 71 oriented at approximately 45 degrees relative to the path of the light 15 emanating towards it, such that the reflected light proceeding away from the beam splitter proceeds in a direction that is approximately 90 degrees relative to the incoming light. In at least some embodiments, the surface 71 can have deposited on it a thin-film coating that allows a fraction of the light 15 to be reflected to the objective lens 80 and a second fraction to be transmitted.

Figure 2:
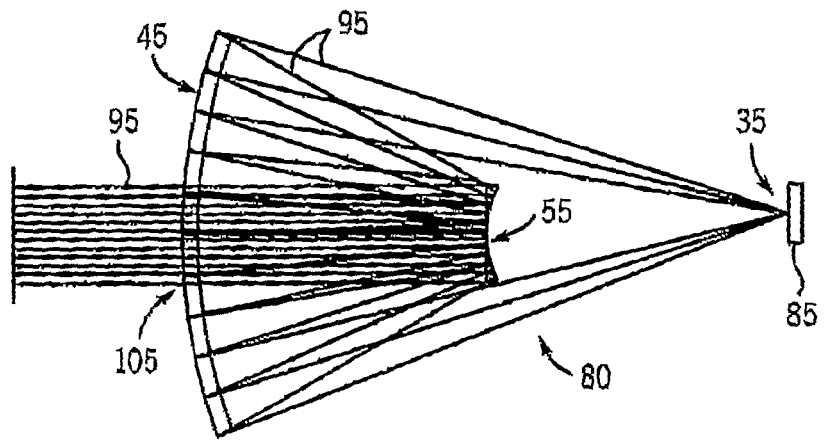
FIG. 2 shows in further detail an objective lens employed in the optical microscope of FIG. 1, in accordance with one embodiment of the present invention.
Figure 3D:
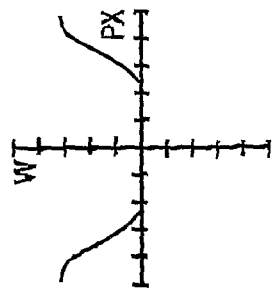
FIGS. 3A-3D show exemplary wavefans for the objective lens of FIGS. 1-2.
Figure 3C:
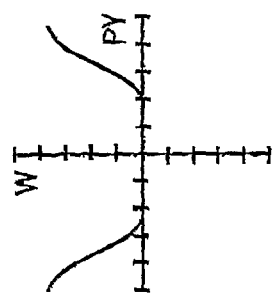
Figure 3B:
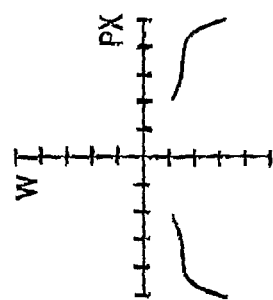
Figure 3A:
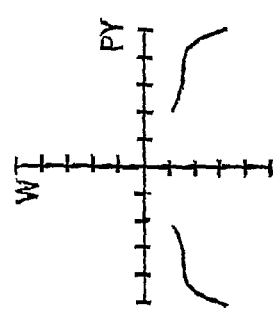
Figure 4A:
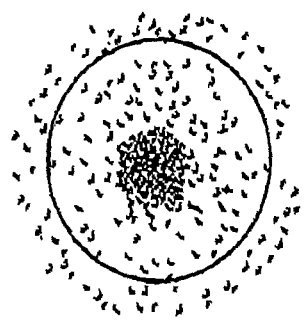
FIGS. 4A-4B shows exemplary spot diagrams for the objective lens of FIGS. 1-2.
Figure 4B:
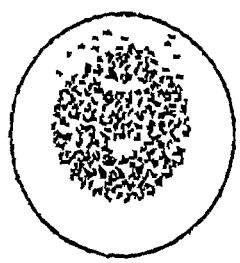

As described in further detail with respect to FIG. 2, the objective lens 80 upon receiving the reflected light from the beam splitter 70 then directs that light at a target 85, which can be any of a variety of structures, materials, etc. (e.g., semiconductor wafers or biological cells). Depending upon the target 85, typically some or most (or even all) of the light incident upon the target is reflected off of the target back toward the objective lens 80. This light reflected off of the target 85 and received by the objective lens 80 then is directed back to the beam splitter 70 by the objective lens as returning light 95. Due to the design of the beam splitter 70 and any additional thin-film coating provided on the surface 71, a fraction of the returning light 95 proceeds through the beam splitter (instead of being reflected by the beam splitter) toward the camera module 90.

The returning light 95 proceeding to the camera module 90 is collimated or substantially collimated such that it is capable of being used for imaging purposes. Thus, upon receiving the returning light 95, the camera module in turn is capable of receiving and observing/storing the light and generating images or imaging information indicative of one or more features of the target 85 based upon that light. Alternatively, the returning light 95 can be slowly converging in order to form an image inside the camera module 90. Additionally, in at least some embodiments, a second substantially-planar surface 73 of the beam splitter 70 (on the opposite side of the beam splitter relative to the first substantially-planar surface 71) can also have an anti-reflection film deposited thereon, so as to limit ghost images from reaching the camera module 90.

In use, the optical microscope 100 operates as follows. First, before the providing of any light from the light source 10 at the Hydrogen Lyman-α line, an operator will first locate the feature of interest (e.g., the target 85 or a portion thereof) using a visible light source (e.g., 400 nm<λ<700 nm), which is not shown in FIG. 1. Upon locating the feature of interest, the operator then switches on the light source 10 (and switches off the visible light source). At that point, the light 15 is directed from the light source 10 to the target 85 by way of the beam splitter 70, mirror 50, etc., which in turn results in the providing of the returning light 95 from the target to the camera module 90. The operator then is able to view a high resolution image obtained by way of the camera module 90 on a video display monitor, which can be considered to form part of the camera module or alternatively be separate from it (e.g., in the form of a personal computer coupled to the camera module by way of a dedicated communication link, a network link, the Internet, wireless communications, or otherwise). Also, the images can be printed in hardcopy form by way of the camera module or otherwise.

Referring additionally to FIG. 2, the objective lens 80 of FIG. 1 is shown in somewhat more detail in relation to the target 85. FIG. 2 particularly illustrates exemplary paths of the returning light 95 reflected off of the target 85, which can be understood as being positioned at a focal point 35. As shown, the central portion of the beam of the returning light 95 provided from the target 85 is occluded from the first spherical mirror 45 by the second spherical mirror 55. The portion of the returning light 95 that reaches the first spherical mirror 45 is reflected by that mirror back to the second mirror 55, which in turn reflects the light out of the objective lens 80 by way of an orifice 105 formed within the first spherical mirror (toward the beam splitter 70 and ultimately the camera module 90). The light emanating from out of the objective lens 80 by way of the orifice 105 preferably is collimated, or substantially collimated. Although not shown in detail, the light 15 from the light source 10 entering the objective lens 80 takes paths that are the opposite or substantially the opposite of those shown. More particularly, upon entering the objective lens 80 by way of the orifice 105, the light 15 is reflected off of the second spherical mirror 55 (which constitutes the pupil of the lens) back toward the first spherical mirror 45, which in turn reflects the light toward the target 85. Although it is not necessarily the case, preferably the objective lens 80, upon receiving the light 15 from the light source, produces uniform Kohler illumination for the target 85 (albeit, more important than producing uniform Kohler illumination is that an accurate camera module 90 be employed in the system).

The objective lens 80 in the present embodiment is a simple Schwartzschild configuration lens having first and second spherical mirrors 45 and 55, respectively, such as that described in "Schwartzschild Objective for Soft X-rays" by I. A. Arioukov and K. M. Krymski (Opt. Eng. 39 (8), 2163-2170 (2000)), which is hereby incorporated by reference herein. In the present embodiment, the objective lens 80 is optimized for an infinite image conjugate in Zemax® lens design software available from ZEMAX Development Corporation of Bellevue, Wash. In particular, the first spherical mirror 45 has a clear aperture diameter of 42.26 mm. For an operation wavelength of 121.6 nm, a numerical aperture of slightly greater than 0.3 is achieved with reasonable field performance out to a field diameter of about 300 μm. Additional details regarding the design are provided in Table 1.

TABLE 1

OBJECTIVE LENS PRESCRIPTION

| Surface/ Reference Numeral | Radius (mm) | Thickness to next element (mm) | Description |
| --- | --- | --- | --- |
| Beam Splitter/70 or Camera Module/90 | Infinity | Infinity | Object is at infinity (reversed configuration for design) |
| Second Spherical Mirror/55 | 20.00 | −32.33 | Second spherical mirror that also functions as the stop. |
| First Spherical Mirror/45 | 52.36 | 68.62 | First spherical mirror |
| Target/85 | Infinity | 0 | Image |

Further exemplary characteristics of the objective lens 80 of FIGS. 1-2 are shown in FIGS. 3A-3D and 4A-4B. More particularly, FIGS. 3A-3D show exemplary wavefans for the objective lens 80, where the lines shown represent the departure of the ideal focusing beam from the real beam as measured at the pupil (the second spherical mirror 55) of the objective lens (with an assumed wavelength λ=121.6 nm). The maximum vertical sale for the wavefans is +/−0.2 wavelengths. The horizontal axes correspond to the dimension across the center of the pupil, from edge to edge (e.g., either the x-axis or the y-axis). The wavefans of FIGS. 3A and 3B, which are respectively plotted versus x-direction and y-direction orthogonal measurement lines across the center of the pupil, correspond to the lens performance of a point centered (0.0000 degrees) in the field of the target 85. The wavefans of FIGS. 3C and 3D, which are respectively plotted versus x-direction and y-direction orthogonal measurement lines across the center of the pupil, correspond to the lens performance of a point at the edge (0.5000 degrees or 0.141 mm) of the field of the target 85. As for FIGS. 4A-4B, these show exemplary spot diagrams for the objective lens 80. In particular, the airy disk diameter (ideal diffraction-limited diameter) is indicated by the circles. The points represent the intersection of the geometric rays, as traced through the system from the target. The spot diagram of FIG. 4A in particular corresponds to the lens performance of a point centered (0.0000 degrees) in the field of the target 85. The spot diagram of FIG. 4B by comparison corresponds to the lens performance of a point at the edge (0.5000 degrees or 0.141 mm) of the field of the target 85.

Additionally it should be noted that, in at least some embodiments, a thin-film coating can be provided on the mirrors 45, 55, in order to enhance mirror reflectivity. One such film is a CVD-coated SiC material, which has between 40% to 50% reflectivity at λ=121.6 nm and exhibits a refractive index of 2.66 leading to a 20% reflectivity for visible light, as described in an article entitled "Ultraviolet reflectance of AlN, diamond-like carbon, and SiC thin films," by M. David, et. al., Appl. Phys. Lett., 57 (11), pp. 1093-1095 (1990), which also is hereby incorporated by reference herein.

Notwithstanding the above description of the objective lens 80, a variety of other lens designs can also be employed depending upon the embodiment, and the present invention is intended to encompass the use of any of a variety of different lenses (including sets of multiple lenses). In embodiments similar to that discussed above in which both visible light and light at the Hydrogen Lyman-α line are used, the large variation in wavelength between the visible light and the light at the Hydrogen Lyman-α line makes it undesirable to utilize refractive optics due to chromatic aberration. Given that to be the case, reflective objective lens designs such as that described above are preferred for such embodiments. Other such reflective lens designs can also be employed including, for example, lens designs employing spherical mirrors in which the Schwartzschild conditions are relaxed (and in which no refracting components or compensating lenses are employed), as described in an article entitled "Reflecting microscopes with spherical mirrors" by K. P. Norris et. al. found in J. Opt. Soc. Am., 41, 111 (1951), which is hereby incorporated by reference herein (the numerical aperture for the microscope shown in that article employing such lenses was approximately 0.65).

In further embodiments, non-spherical mirrors can be utilized in the optical microscope, for example, as shown in an article entitled "Reflecting microscope objectives with non-spherical mirrors" by S. Miyata found in J. Opt. Soc. Am, 42, 431 (1952), which is hereby incorporated by reference herein (in this example, the aplanatic objective lens was free of spherical aberration and coma). Also, notwithstanding the above description regarding the objective lens 80, in some alternate embodiments additional improvements to Schwartzschild mirrors can be employed, as described in articles entitled "A new series of microscope objectives: I. Catadioptric Newtonian Systems" by D. S. Gray, J. Opt. Soc. Am., 39, 719 (1949), "A new series of microscope objectives: II. Preliminary investigation of catadioptric Schwarzschild systems" 39, 723 (1949), and "New series of microscope objectives: III. Ultraviolet objectives of intermediate numerical aperture" 40, 283 (1950), which also are hereby incorporated by reference herein. Still in further embodiments, other types of mirrors or mirror assemblies such as Cassegrain reflectors can instead (or in addition) be utilized.

Figure 5A:
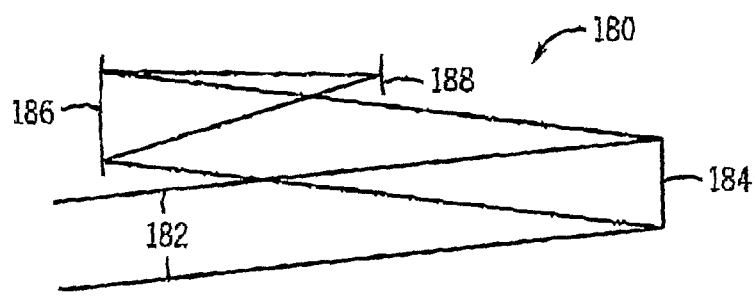
FIGS. 5A-5B show, in further detail, first and second additional objective lenses that can be employed in the optical microscope of FIG. 1.
Figure 5B:
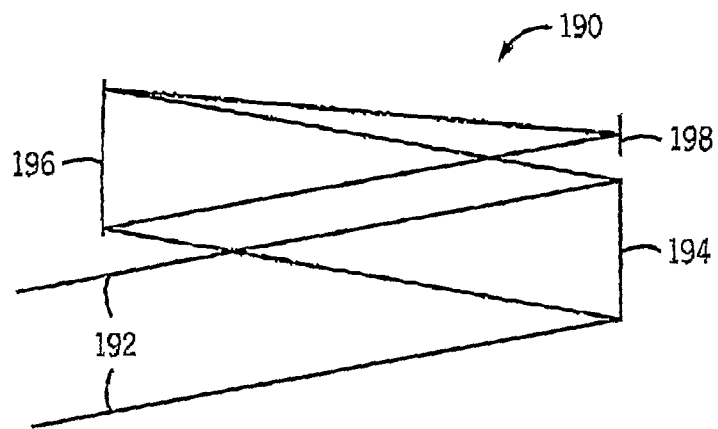

Further in this regard, FIGS. 5A and 5B illustrate first and second additional embodiments for objective lenses 180 and 190, respectively, which are described in additional detail at pages 200 and 202, respectively, of "Reflective Optics" by Dietrich Korsch (Academic Press, San Diego, 1991), which is hereby incorporated by reference herein. As shown, the objective lens 180 is a reflective analog of a Schmidt telescope in which incoming light rays 182 (e.g., light from the light source 10) are first reflected off of a primary correction (entrance pupil) mirror 184 and then subsequently reflected a second time off of a spherical secondary mirror 186, which focuses the rays at a focal point 188 (albeit in this example it should be understood that the path(s) of the light rays are not the same as the paths from a light source in a Kohler configuration). Light reflected off of a target (such as the target 85 of FIG. 1) located at the focal point 188 can return along a path that is effectively the reverse of that followed by the incoming rays 182, after which the light is directed toward a camera module (e.g., by way of the beam splitter 70). As for the objective lens 190, it is an aplanatic, flat-field two-mirror telescope with a primary corrector. More particularly as shown, incoming light rays 192 are first received at and reflected by a primary corrector mirror 194, which reflects the light toward a secondary mirror 196, which in this example is of an oblate ellipsoid shape. The secondary mirror 196 in turn reflects and focuses the light toward a focal point 198, at which can be a target (and where, again, the light ray paths are not identical to those of a Kohler configuration). Light reflected off of the target can return along a path that is effectively the reverse of that followed by the incoming rays 182, after which the light is directed toward a camera module.

Although the above embodiments employing visible light in addition to light at the Hydrogen Lyman-α line envision the use of only reflective objective lens designs, it should be further noted that in other alternate embodiments it is possible to utilize both reflective and refractive optics. For example, several of the above-referenced reflective microscope designs described in the literature were intended for use with an illumination source being the Hg 253.7 nm emission line, in the near ultraviolet spectral region where air is transparent. Quartz is also transparent in this region and consequently a microscope design comprising both reflective and refractive optics is possible. Further, in still other alternate embodiments, it is not necessary to utilize a visible light source at all. For example, the use of visible emissions from a Hydrogen/Helium discharge will obviate the need for a separate visible light source. This visible emission from the gas-discharge is mainly due to Hydrogen Balmer lines and electron-ion recombination emission in the gas-discharge region.

Additional lens systems having both reflective and refractive optical components can be formed through the use of a solid immersion lens (SIL) (or possibly several such lenses). For example, one such system 200, which is shown in FIG. 6, incorporates both a SIL 199 in combination with an objective lens such as the objective lens 80 of FIG. 2 having both the first and second spherical mirrors 45 and 55, respectively. As shown, the SIL 199 in this embodiment is positioned proximate the focal point 35 at which is located the target 85. SILs such as the SIL 199 can be made from LiF or $MgF_2$. A SIL composed of an image-centric LiF hemisphere in particular can increase the effective numerical aperture of the system from 0.3 to 0.486. Other reflective microscope designs with higher numerical aperture can also, when augmented with a SIL, produce numerical apertures greater than 1.0.

As already noted, the optical microscope 100 shown in FIG. 1 employs light at the Hydrogen Lyman-α line, that is, light having a wavelength of 121.6 nm (or substantially or approximately 121.6 nm). The use of light at this wavelength is advantageous in several regards. First, light at the Hydrogen Lyman-α line is fairly easily transmissible through air without a vacuum, such that the optical microscope 100 can be operated without any need for a high-vacuum light path. More particularly, strong absorption of light by molecular Oxygen ($O_2$) generally occurs for wavelengths below about 190 nm, such that air generally is opaque in the deep ultraviolet region of the electromagnetic spectrum. However, by a coincidence of Nature, there exists a narrow, highly transparent "window" in the air absorption spectrum that coincides with the Hydrogen Lyman-α line. Variation in the absorption of light by Oxygen at and around the Hydrogen Lyman-α line is shown in FIGS. 7 and 8, which respectively show the absorption spectrum in Oxygen between 125 nm and about 180 nm, and the absorption spectrum in Oxygen between 105 nm and about 135 nm, respectively.

Figure 7:
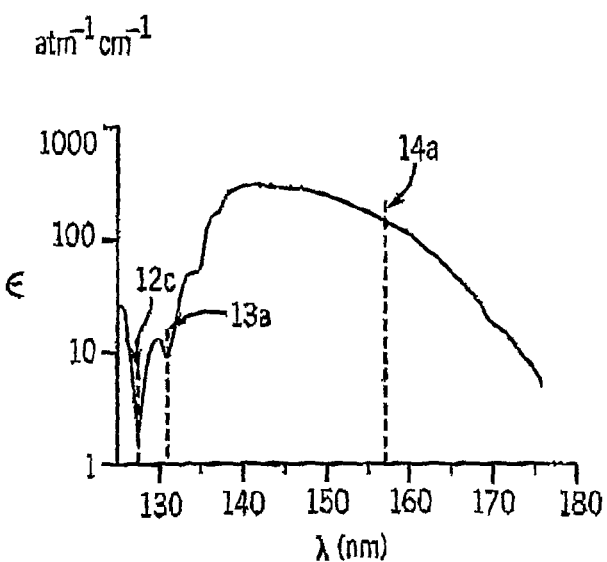
FIG. 7 is the absorption spectrum of Oxygen between 125 nm and about 180 nm.
Figure 8:
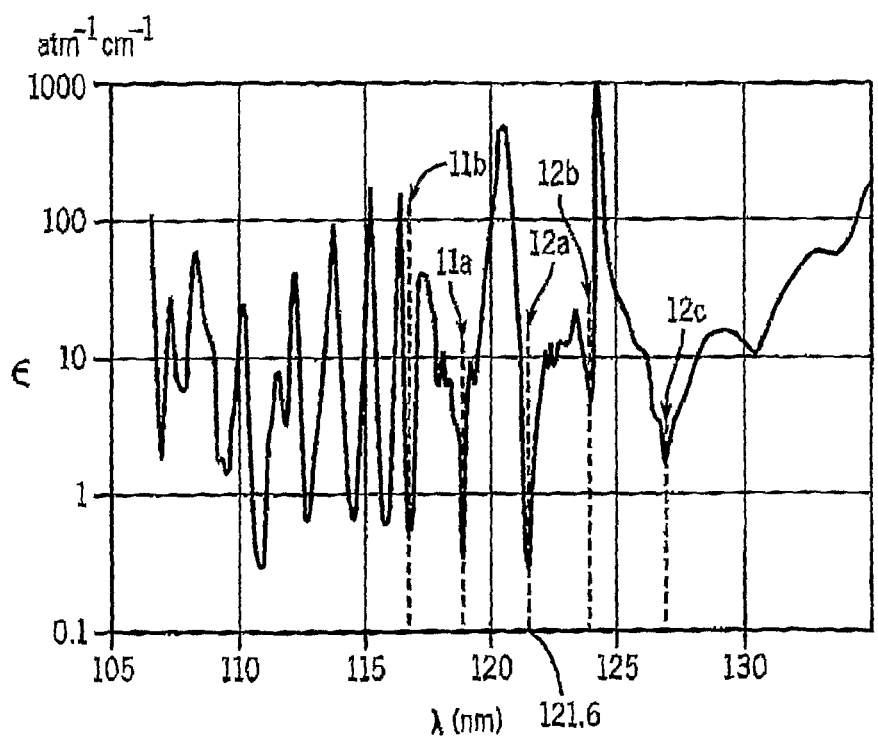
FIG. 8 is the absorption spectrum in Oxygen between 105 nm and about 135 nm, showing an absorption "window" at 121.6 nm.

More particularly as shown in FIGS. 7 and 8, the absorption coefficient of Oxygen with respect to light having wavelength(s) at or near 121.6 nm is particularly low in comparison with the absorption coefficients for light at essentially all wavelengths longer than 121.6 nm, up to at least about 180 nm. Further as shown particularly in FIG. 8, at standard temperature and pressure, the absorption coefficient of Oxygen $\epsilon$ (in $atm^{-1}\ cm^{-1}$) has a local minimum at the Hydrogen Lyman-$\alpha$ line ($\lambda$=121.6 nm), and the absorption coefficient remains less than 25 $atm^{-1}\ cm^{-1}$ within a window encompassing the Hydrogen Lyman-$\alpha$ line that is approximately 1 to 2 nm (or even slightly larger) in width. The absorption coefficient of Oxygen $\epsilon$ for light at 121.6 nm specifically is about 0.3 $atm^{-1}\ cm^{-1}$, as indicated by a location 12a of FIG. 8, which is one to three orders of magnitude less than the absorption coefficients for light at other wavelengths between this window and 175 nm.

Because of this window in the Oxygen (and consequently, atmospheric air) spectrum for light at the Hydrogen Lyman-$\alpha$ line, for path lengths of a few centimeters in air, at atmospheric pressure, transmission of light at the Hydrogen Lyman-$\alpha$ line exceeds 50%. For example, if light at 121.6 nm having an absorption coefficient of 0.3 $atm^{-1}\ cm^{-1}$ is transmitted over a 2 cm distance, the light will only experience about 12% absorption, such that 88% of the light will be transmitted over such transmission path. This is in contrast to the absorption associated with light having a wavelength of, for example, 157 nm (see arrow 14a of FIG. 7), in which nearly total absorption occurs over a transmission path of less than 1 mm as a result of the high absorption coefficient (about 200 $atm^{-1}\ cm^{-1}$). Table 2 shows in more detail the path length in air required at various pressures for a fifty percent absorption of radiation, for two different absorption coefficients: $\epsilon_{121.6}$=0.3 $atm^{-1}\ cm^{-1}$, and $\epsilon_{150.0}$=200 $atm^{-1}\ cm^{-1}$. From this information, it is apparent that the use of light at the Hydrogen Lyman-$\alpha$ line allows for much more efficient transmission of the light through the air than is afforded when using light having a wavelength of 150 nm.

TABLE 2

MAXIMUM PATH LENGTHS WITHIN AIR ALLOWING FOR 50% TRANSMISSION OF LIGHT AT 121.6 NM AND 150 NM

| P (atm.) | Light Path (cm) @ 121.6 nm | Light path (cm) @ 150.0 nm |
|---|---|---|
| 1.00 | 11.0 | 0.0165 |
| 0.50 | 22.0 | 0.033 |
| 0.10 | 110 | 0.165 |
| 0.050 | 220 | 0.330 |
| 0.010 | 1100 | 1.65 |
| 0.0010 | 11000 | 16.5 |

Although the use of light at the Hydrogen Lyman-$\alpha$ line having a wavelength of 121.6 nm is particularly advantageous for transmission purposes, FIGS. 7 and 8 additionally illustrate that there are several other local minima in terms of absorption that occur proximate the Hydrogen Lyman-$\alpha$ line, within a region extending below about 135 nm. For example, additional local minima also occur at locations 11a, 11b, 12b, 12c, and 13a, all of which are within about 10 nm of the Hydrogen Lyman-$\alpha$ line. Therefore, although the above-described embodiments of the invention primarily envision the use of light at the Hydrogen Lyman-$\alpha$ line, it is possible that alternate embodiments of the invention would utilize light at other wavelengths instead of or in addition to light at the Hydrogen Lyman-$\alpha$ line, and particularly light at wavelengths corresponding to the aforementioned locations at which absorption minima occur.

In addition to coinciding with a window in the Oxygen absorption spectrum, the use of light at the Hydrogen Lyman-$\alpha$ line is also advantageous in that it can be fairly easily generated by way of any of a variety of different light source mechanisms. It is well known that microwave excitation is effective in creating gaseous discharge emissions, for example, as shown in "Microwave Breakdown in Gases" by A. D. MacDonald (John Wiley, New York, 1966), which is hereby incorporated by reference herein. Further for example, small, microwave driven Hydrogen Lyman-$\alpha$ line light sources (and the Deuterium analog) have been fabricated to study chemical kinetics, as described by an article entitled "Quenching and Radiative Lifetimes for NH ($b^1\epsilon^+$, $v^1$=0)" by B. Gelernt and S. V. Filseth in Chem. Phys. Lett. 36, 238 (1975), which is hereby incorporated by reference herein.

Figure 9:
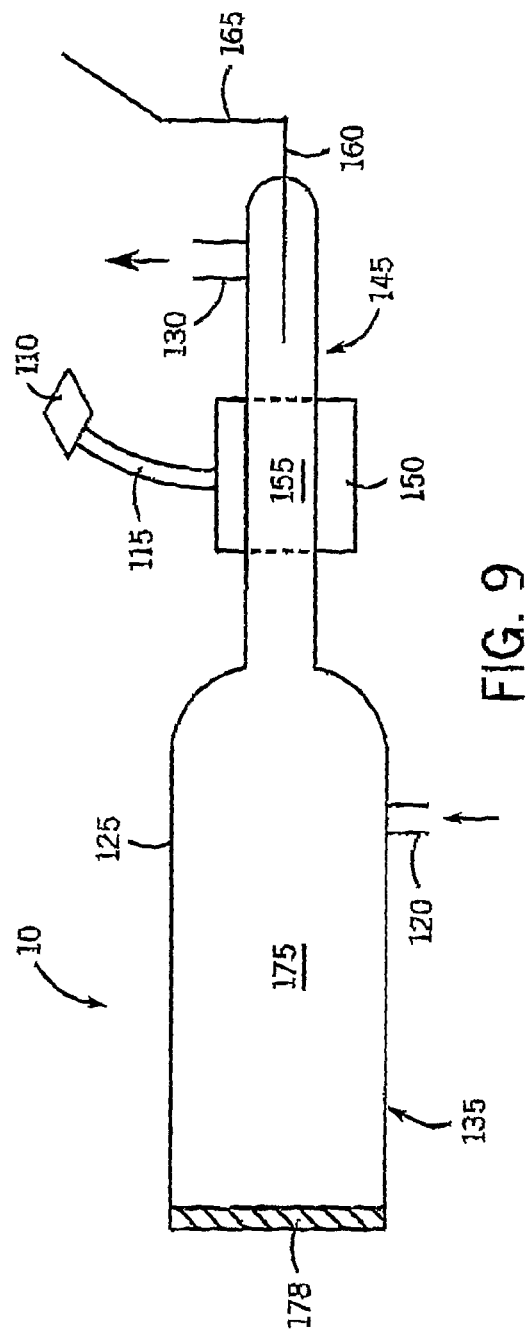
FIG. 9 shows in schematic form one exemplary design of a light source capable of producing light at the Hydrogen Lyman-α line that can be employed in the optical microscope of FIG. 1, in accordance with one embodiment of the present invention.

Turning to FIG. 9, one exemplary configuration of the light source 10 of FIG. 1 that is capable of producing light at the Hydrogen Lyman-$\alpha$ line in accordance with one embodiment of the present invention is shown to involve a microwave-excited gas discharge process. In this exemplary embodiment, the microwave energy is provided by a microwave source 110 (or, in alternate embodiments, by some other excitation source). The Hydrogen Lyman-$\alpha$ line is at a much shorter wavelength than other Hydrogen emissions or Helium discharge emissions (above the LiF cut-off), and background emission is avoided if Helium is used as a diluent gas in the light source, as discussed in "Vacuum Ultraviolet Spectroscopy" by Zaidel & Shreider, pp. 2-20, Ann Arbor-Humphrey Science Publishers, (1970), which is hereby incorporated by reference herein. Thus, in the present embodiment, a $H_2$/He mixture is introduced via a gas inlet 120 into a housing 125 of the light source 10 and subsequently exits the housing via a gas outlet 130. It can be desirable to have a mixture in which the $H_2$ component is below the flammability limit; however, mixtures with higher concentrations of Hydrogen can also be utilized.

Further as shown, the housing 125 in the present embodiment is a substantially elongated structure of tubular cross-section, where about a first half 135 of the housing is of a larger diameter and a second half 145 of the housing is of a smaller diameter. Additionally, the housing 125 in the present embodiment can be fabricated from quartz or other suitable, non-electrically-conductive material, and in other embodiments can be made from other materials as well. To produce flow of the $H_2$/He mixture through the housing 125 and out the outlet 130, a low capacity mechanical pump (not shown) is further attached to the outlet. The $H_2$/He mixture within the housing 125 is typically desirably maintained at a sub-atmospheric pressure within an interior 175 of the housing. To regulate the pressure within the interior 175, a needle valve (not shown) is also attached to the gas inlet 120 and, by way of a controller (or other mechanism), the operation of the mechanical pump is controlled based upon the information from the needle valve so as to control and regulate the sub-atmospheric pressure in the housing 125.

Additionally as shown, a cylindrical (annular) microwave cavity 150 (such as a quarter-wave Evenson Cavity) concentrically surrounds a discharge region 155 of the second half 145 of the housing 125. Power from the microwave source 110 is supplied to the microwave cavity 150 by way of a waveguide conduit 115. To facilitate initial gas breakdown (as may not always automatically occur) and thereby field ionize the gas mixture components within the interior 175 of the housing 125, a high-voltage pulse through an electrode 160 is also provided at the outer end of the second half 145 of the housing 125 as shown. The electrode 160 is connected to a high-voltage source (not shown) through an electrical lead (or leads) 165. Optimization of the light source 10 depends on various factors, which can be varied depending upon the embodiment, including mixture composition, microwave frequency and power, dimensions of the discharge region 155, gas pressure, and cavity tuning.

Figure 10:
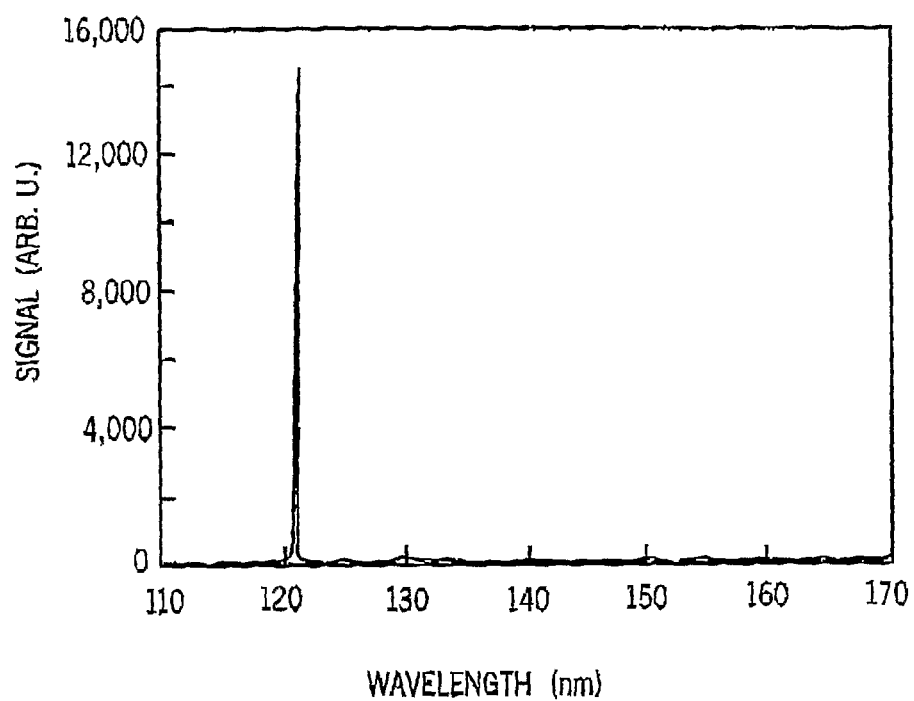
FIG. 10 is the emission spectrum of a Hydrogen-discharge light source such as that of FIG. 9, between about 110 nm and 170 nm.

Once the gas mixture within the interior 175 is appropriately ionized, and microwave energy is communicated to the discharge region 155 by way of the microwave source 110, the waveguide conduit 115 and the microwave cavity 150, a gas discharge occurs in which the Hydrogen portion of the gas mixture emits light at the Hydrogen Lyman-α line. The Hydrogen Lyman-α line at 121.6 nm is a high-intensity, non-coherent source, and more particularly, is actually a spectroscopic doublet, where the two equal intensity, nearly degenerate components have a separation of only 0.0005 nm so as to result in essentially a monochromatic light source. FIG. 10 shows the emission spectrum of a Hydrogen discharge between 110 nm and 170 nm to include the Hydrogen Lyman-α line at 121.6 nm, as can be found in an article entitled "Prospects for photolithography at 121 nm" by Lieberman et al. in J. Vac. Sci. Technol. B, 20 No. 6 November/December 2002, which is hereby incorporated by reference herein. It should be noted that, in the present embodiment, the light source 10 is capable of being varied in its power output (e.g., it can provide a higher-level power output, and therefore a more intense Hydrogen Lyman-α emission).

While the above description suggests that the light emanating from the light source 10 is exactly at the Hydrogen Lyman-α line, this is not to say that the light source 10 necessarily will be limited to emitting light at the wavelength of the Hydrogen Lyman-α line, 121.6 nm. Rather, the present invention is intended to encompass various embodiments in which all or a substantial proportion of light generated by the light source is within (or concentrated at) a window in the deep ultraviolet region of the electromagnetic spectrum at which the absorption coefficient of Oxygen is sufficiently low so as to make transmission of the light feasible in the absence of a high vacuum. Thus, while some embodiments of the invention employ light that is only exactly (or substantially exactly) at the wavelength of the Hydrogen Lyman-α line, 121.6 nm, other embodiments of the invention generate light within a window or small range of wavelengths about the wavelength of the Hydrogen Lyman-α line. For example, in some embodiments, the light source generates light within a window that is at least one of about 1.0 nm and about 2.0 nm in width and encompasses the wavelength of the Hydrogen Lyman-α line, for example, light at wavelengths ranging approximately from 121.0 to 122.0 nm or from 121.1 to 122.1 nm, or from 120.5 to 122.5 or from 120.6 to 122.6. In still further embodiments, the window can be 4 nm in size, e.g., +/−2 nm on either side of 121.6 nm, or 8 nm in size, e.g., +/−4 nm on either side of 121.6 nm, etc. Additionally as shown above, several other local minima in the absorption coefficient of Oxygen occur at other wavelengths within the vacuum ultraviolet region proximate the Hydrogen Lyman-α line and so, in further embodiments, one or more light sources are employed to generate light at one or more of these other wavelengths in addition to or instead of at the wavelength of the Hydrogen Lyman-α line, and/or within windows about these wavelengths in addition to or instead of at the wavelength of the Hydrogen Lyman-α line.

The light generated within the interior 175 then proceeds out of the housing 125 by way of an optical window 178 located at the outer end of the first half 135 of the housing, after which it is directed toward the mirror 50 and ultimately to the objective lens 80. In the present embodiment, the optical window 178 is about 0.5 to about 5 mm in thickness, and is securely attached to the remainder of the housing 125, so as to effectively seal the interior 175 from regions exterior to the housing. Preferably, the optical window 178 is placed several centimeters from the discharge region 155 to prevent deterioration of window transmission from ion bombardment. Use of the window 178 makes it possible to control the gas pressure within the interior 175 and particularly within the discharge region 155, and prevents contamination from the light source 10 from entering the rest of the microscope.

Although the present embodiment shows the optical microscope 100 as including both the window 80 of the light source 10 and also the window 75 of the source module 60 of FIG. 1, it will be understood that in some sense the two windows are duplicative and, consequently, in alternate embodiments only one of those two windows will be present (for example, the source module 60 need not be sealed in some embodiments). With respect to the transmittive materials used as the optical windows 75 and 178 (and possibly for other components of the optical microscope 100 as well), high quality components can be fabricated from polished LiF or, alternatively, $MgF_2$. $CaF_2$ is a further possible alternative, but exhibits only poor transmission (e.g., less than 5%). Also, in some embodiments, two or more of these and/or other materials can be employed. In selecting among these materials, it can be noted that the theoretical absorption edge for LiF is approximately 105 nm, and for $MgF_2$ it is near 115 nm. $MgF_2$ is far less hygroscopic than LiF.

Figure 11:
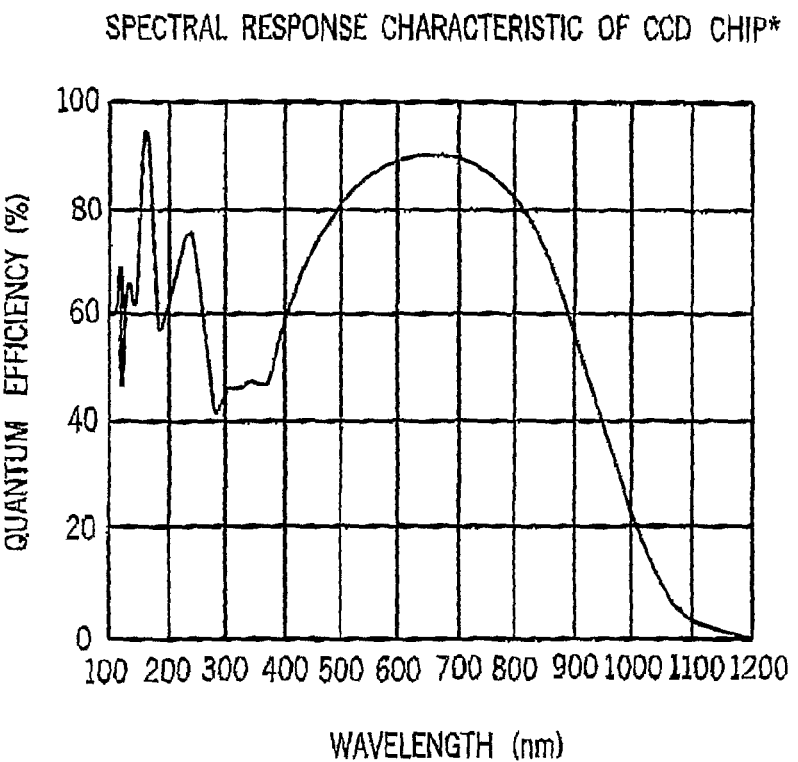
FIG. 11 shows a typical spectral response characteristic of a CCD chip, such as used in the Hamamatsu C8000-10 vacuum ultraviolet camera system, as can be employed in the optical microscope of FIG. 1 in one embodiment of the present invention.

As for the camera module 90, it can take a variety of forms depending upon the embodiment so long as the camera module is capable of receiving and sensing/detecting light at (and around) the Hydrogen Lyman-α line (e.g., at λ=121.6 nm) and generating images based thereupon. In at least some embodiments, the camera module 90 can be a charge coupled device (CCD) camera. For example, one exemplary CCD camera that is sensitive to light at the Hydrogen Lyman-α line and thus can be employed in certain embodiments as the camera module 90 is the Hamamatsu C8000-10, available from Hamamatsu Photonics, K.K., of Hamamatsu City, Japan. That camera's spectral sensitivity is shown in FIG. 11. The pixel size of this camera is 14 μm, such that in at least some embodiments, the magnification of the camera module is 60. Also, in some embodiments, such a magnification can be achieved by altering the design of the Schwarzschild objective lens 80 slightly (yielding this magnification between the object and image), without adding any additional optical components.

Depending upon the embodiment, the camera module 90 is capable of a variety of imaging operations, image processing operations and other operations after receiving and sensing/detecting. In some embodiments, the camera module 90 records imaging information on film that is then processed externally by a third party, or more immediately by the camera module itself. In other embodiments, the camera module 90 stores imaging information on memory within or associated with the camera module. This imaging information can, in at least some embodiments, be stored digitally. Further, in some embodiments, the camera module is capable of performing various digital processing operations upon the imaging information, as well as capable of transmitting the processed (or unprocessed) imaging information to other devices (e.g., computer systems) associated with or remote from the camera module. Such transmission can occur, in at least some embodiments, by various network communication links or even via the internet or the World Wide Web, via hardwired or wireless communication links. In some embodiments, the camera module itself is capable of displaying (e.g., on a video screen or monitor) the images, and/or capable of printing hardcopies of images.

From the discussion provided above, it should be evident that embodiments of the present invention, by utilizing light at (or near) the Hydrogen Lyman-α line, are capable of allowing high-resolution optical microscopy, without the need for a high vacuum light path between the light source, the camera and the target. The present invention is intended to encompass a wide variety of structures, components, and methods of operation (and construction) of optical microscopes capable of operating at (or near) the Hydrogen Lyman-α line that differ from the particular embodiments described above, which are merely intended to be exemplary. For example, while the above embodiments particularly envision the use of Hydrogen gas, Deuterium is equally applicable in at least some embodiment of the present invention. Also for example, while in the embodiment of FIG. 1 the objective lens 80 both communicates light to the target 85 and communicates reflected light away from the target 85, in alternate embodiments two different lens devices (or other devices) could be employed to perform these two operations.

Embodiments of the present invention can be employed in relation to a variety of different applications. For example, optical microscopes in accordance with the present invention can be utilized in examining semiconductor wafers, biological (e.g., cellular/tissue) specimens, or optical recording surfaces, as well as in the research and development of MEMS (microelectromechanical systems), various metallurgical applications, and the fabrication of various nanostructures for electronics and medical diagnostics. Additionally, embodiments of the present invention also include other systems and methods that include one or more optical microscopes, or perform operations involving optical microscopy.

Although various embodiments which incorporate the teachings of the present invention have been shown and described in detail herein, those skilled in the art can readily devise many other varied embodiments that still incorporate these teachings. That is, it is specifically intended that the present invention not be limited to the embodiments and illustrations contained herein, but include modified forms of those embodiments including portions of the embodiments and combinations of elements of different embodiments as come within the scope of the following claims.

We claim:

1. An apparatus for performing optical microscopy comprising:
at least one light source including a deep ultraviolet light source configured to generate first light having a wavelength within a window in the deep ultraviolet region of the electromagnetic spectrum within which a local minimum in the absorption coefficient of oxygen occurs, wherein the wavelength is approximately 121.6 nm, and wherein the at least one light source is further configured to generate second light that includes visible light or near-ultraviolet light and that is directed toward a target location;
a lens device that receives at least a first portion of the generated first light, directs at least some of the first portion of the generated first light toward the target location, receives reflected light from the target location, and directs at least some of the reflected light toward a further location, wherein a light path between the deep ultraviolet light source and the target location is other than at a high vacuum; and
a camera device that is positioned at one of the further location and an additional location, wherein the camera device receives at least a second portion of the reflected light,
whereby an image is generated by the camera device based upon the second portion of the reflected light, and the performing of the optical microscopy is allowed.

2. The apparatus of claim 1, wherein the second light includes the visible light.

3. The apparatus of claim 2, wherein the window is one of approximately 1 nm in width, approximately 2 nm in width, approximately 4 nm in width, and approximately 8 nm in width.

4. The apparatus of claim 2, wherein the wavelength corresponds to one or both of a Hydrogen Lyman-α line and a Deuterium Lyman-α line.

5. The apparatus of claim 1, further comprising a beam splitter positioned between at least two of the deep ultraviolet light source, the lens device and the camera device.

6. The apparatus of claim 5, wherein the beam splitter has at least one substantially planar surface.

7. The apparatus of claim 5, wherein the beam splitter includes at least one surface upon which is provided a coating layer.

8. The apparatus of claim 5, wherein the beam splitter is positioned between the lens device and each of the deep ultraviolet light source and the camera device.

9. The apparatus of claim 5, wherein the beam splitter receives the generated first light from the deep ultraviolet light source, and wherein the beam splitter reflects the first portion of the generated first light toward the lens device.

10. The apparatus of claim 5, wherein the beam splitter is positioned at the further location, wherein the beam splitter receives the at least some of the reflected light, and wherein the beam splitter further transmits the second portion of the reflected light to the camera device.

11. The apparatus of claim 2, wherein the lens device is an objective lens device that focuses the at least some of the first portion of the generated first light toward the target location.

12. The apparatus of claim 11, wherein the lens device includes at least first and second mirrors.

13. The apparatus of claim 12, wherein the lens device is a Schwartzschild lens device, wherein each of the first and second mirrors is a spherical-type mirror, wherein the lens device receives the first portion of the generated first light by way of a pupil, and wherein the first portion of the generated first light is reflected between the first and second mirrors within the lens device.

14. The apparatus of claim 11, wherein the lens device includes a solid immersion lens device.

15. The apparatus of claim 2, wherein the at least some of the reflected light that is directed to the further location is substantially collimated.

16. The apparatus of claim 2, wherein the deep ultraviolet light source includes a microwave source that supplies microwave energy to a microwave cavity.

17. The apparatus of claim 16, wherein the microwave source includes a Gunn diode.

18. The apparatus of claim 16, wherein a mixture of Hydrogen and Helium is supplied to an interior region within a housing of the deep ultraviolet light source.

19. The apparatus of claim 18, wherein the deep ultraviolet light source includes an optical window through which the generated first light is transmitted, and wherein the interior region is substantially sealed relative to a region outside of the deep ultraviolet light source.

20. The apparatus of claim 2, wherein the camera module performs digital image processing based upon the second portion of the reflected light to arrive at the image.

21. A semiconductor manufacturing or inspection system comprising the apparatus of claim 1.

22. A method of performing optical microscopy, the method comprising:
providing visible light to a target location;
generating additional light at a light source, wherein a wavelength of the generated additional light is within a window in the deep ultraviolet region of the electromagnetic spectrum within which a local minimum in the absorption coefficient of Oxygen occurs, the window being at least one of about 1.0 nm and about 2.0 nm in width, wherein the wavelength is approximately 121.6 nm;
transmitting the generated additional light to the target location by way of an optical window structure of the light source and at least one lens device, wherein the optical window structure substantially seals off, from an outside atmosphere, a region within a housing of the light source that experiences a sub-atmospheric pressure, and wherein a light path between the light source and the target location is other than at a high vacuum;
communicating reflected light received from the target location to a further location, wherein at least a portion of the reflected light is at the wavelength and occurs in response to the transmitting of the generated additional light to the target location; and
producing an image based upon the reflected light.

23. The method of claim 22, wherein the at least one lens device includes an objective lens capable of focusing the generated additional light onto the target location.

24. The method of claim 23, wherein the objective lens has first and second mirrors.

25. The method of claim 24, wherein the reflected light is communicated by way of the objective lens toward at least one of a beam splitter and a camera module, and wherein the reflected light upon exiting the objective lens is substantially collimated.

26. The method of claim 24, wherein the objective lens is a Schwartzschild configuration lens, and each of the first and second mirrors is a spherical mirror.

27. The method of claim 22, wherein the light source includes a microwave source that provides microwave energy to a microwave cavity, which in turn causes excitation of a Hydrogen-containing gas within an interior portion of the light source.

28. The method of claim 22, wherein the generated additional light exits the light source by way of the optical window which is made from at least one of LiF, MgF$_2$ and CaF$_2$.

29. The method of claim 22, wherein the light source operates by way of a microwave excitation of at least one of Hydrogen and Deuterium, wherein the visible light is provided from a visible light source, and wherein the providing of the visible light allows for locating of a feature of interest prior to the generating of the additional light.

30. The method of claim 22, wherein the image is representative of at least one exterior feature of a target item positioned at the target location, the exterior feature having a surface area, and further comprising processing information corresponding to the reflected light so as to arrive at the image.

31. An apparatus for performing optical microscopy comprising:
means for generating first light that includes visible light or near-ultraviolet light, the first light being directed toward a target region;
means for generating additional light having a wavelength within a window in the deep ultraviolet region of the electromagnetic spectrum, where an absorption coefficient of Oxygen at standard temperature and pressure that corresponds to the first wavelength is less than 25 atm$^{-1}$ cm$^{-1}$, wherein the wavelength is approximately 121.6 nm;
means for directing at least a first portion of the generated additional light toward the target region and for directing reflected light received from the target region toward a further location in a substantially collimated manner; and
means for producing an image based upon at least a portion of the reflected light, the image being representative of a feature of a target item positioned at the target region,
wherein a light path between the means for generating additional light and the target region is other than at a high vacuum.

32. The apparatus of claim 31, wherein a region within a housing of the means for generating additional light experiences a sub-atmospheric pressure and is substantially sealed off from an outside atmosphere at least in part by way of an optical window structure through which the first portion of the generated additional light passes prior to being received by the means for directing.

33. The apparatus of claim 1, wherein a region within a housing of the deep ultraviolet light source experiences a sub-atmospheric pressure and is substantially sealed off from an outside atmosphere at least in part by way of an optical window structure through which the first portion of the generated first light passes prior to being received by the lens device.

34. The apparatus of claim 33, wherein the optical window structure is made from at least one of LiF, MgF$_2$ and CaF$_2$, and
wherein the apparatus further comprises a pump coupled to the deep ultraviolet light source to control and regulate the sub-atmospheric pressure in the housing.

35. The apparatus of claim 33, wherein the wavelength corresponds to an atomic emission line.

36. The apparatus of claim 31, wherein the first light is within a wavelength range of 400 nm to 700 nm.

37. The apparatus of claim 2, wherein an absorption coefficient of oxygen at standard temperature and pressure that corresponds to the first wavelength is less than 25 atm$^{-1}$ cm$^{-1}$.

38. The apparatus of claim 2, wherein the at least one light source includes a visible light source that is configured to generate the second light that includes the visible light.

* * * * *